Sept. 18, 1928.  W. G. BRYANT  1,685,042

JUMP RING COUPLING

Filed June 25, 1927

Inventor:
WALDO G. BRYANT
By his Attorneys

Patented Sept. 18, 1928.

1,685,042

UNITED STATES PATENT OFFICE.

WALDO G. BRYANT, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

JUMP-RING COUPLING.

Application filed June 25, 1927. Serial No. 201,537.

My invention relates to jump ring couplings, and the object of my invention is to provide a simple, attractive and effective coupling between the jump ring and a bead chain.

In the accompanying drawings—

Figure 1:
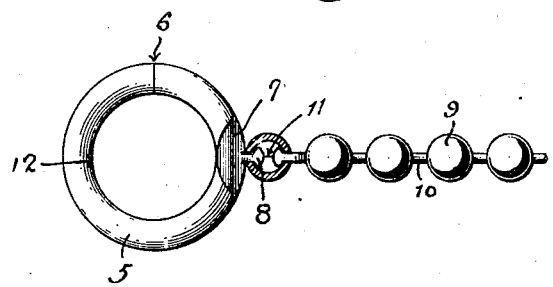
Figure 2:
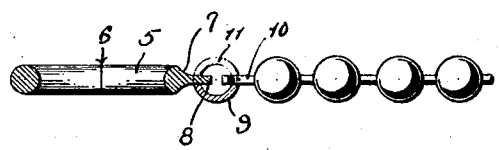

Fig. 1 is a side elevation partially in section illustrating the improved coupling; and Fig. 2 is a broken side elevation at right angles thereto.

Referring to the drawings, I have shown a jump ring 5 which is split at 6 so that it may be opened as usual. At a point spaced approximately 90° from the split 6, the ring is swedged out at 7 to form a peripheral flange or fin from which in turn is blanked the headed projection 8.

The bead chain is of well known type, comprising balls 9 flexibly interconnected by dumb-bell links 10. The several balls 9 of the chain are formed from flat strip sheet metal in accordance with the teachings of the Goodridge & Gagnon Patent No. 1,087,876, February 17, 1914, and are longitudinally split as indicated at 11. The terminal ball of the chain therefore may be opened to receive the head of the projection 8 on the jump ring 5, then closed to tie the chain to the ring. The headed projection 8 on the ring 5 corresponds in length and size to a half-link, and is thus accommodated within the terminal ball of the chain with the same facility and with the same security as the terminal link 10 of the chain.

The construction is inexpensive and effective. From the standpoint of appearance it is desirable, since it interposes no coupling member between ring and chain which is out of harmony with either. It has the further practical advantage that the split 6 of the ring is positively maintained at a point spaced from the area 12 engaged by an associated member, and longitudinally prevents accidental escape of the latter from the ring should the split 6 open.

I claim as my invention—

A split jump ring having at a point spaced from the split in the ring a peripheral projection swedged from the body of the ring, said projection being of less thickness than the ring and having a head adapted for engagement by the split end ball of a bead chain.

In testimony whereof I have signed my name to this specification.

WALDO G. BRYANT.